H. F. & T. R. BARGAR.
Seed-Planter.
No. 40,595.
Patented Nov. 17, 1863.
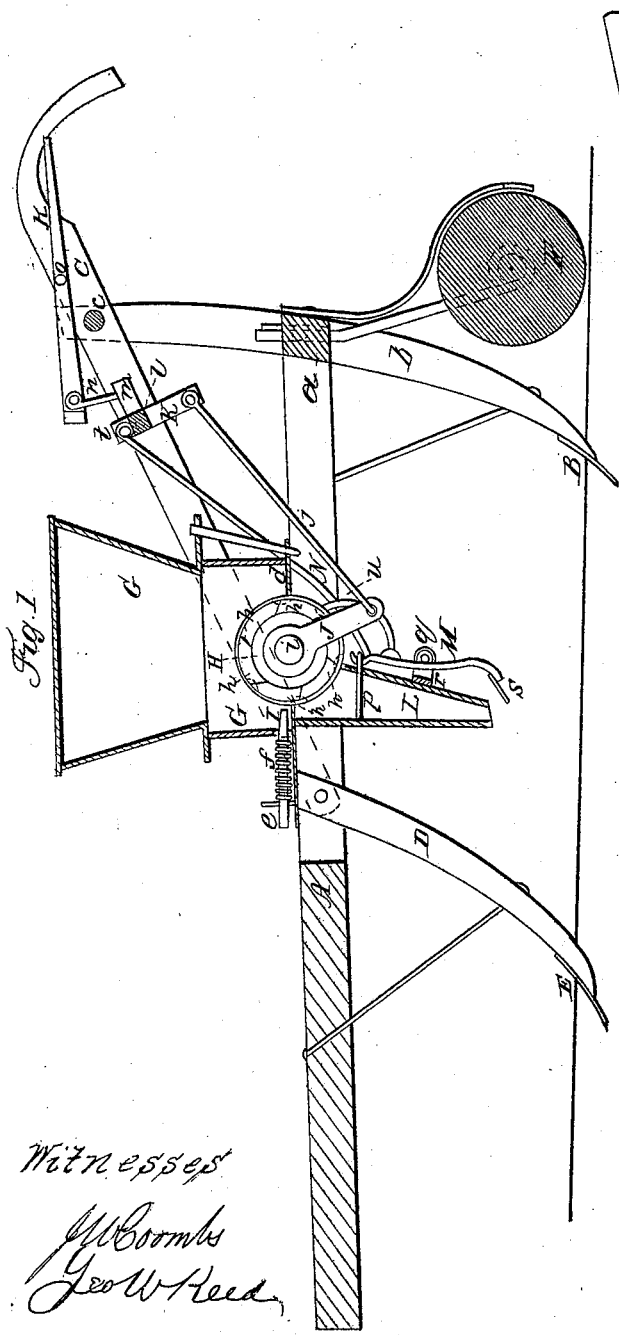
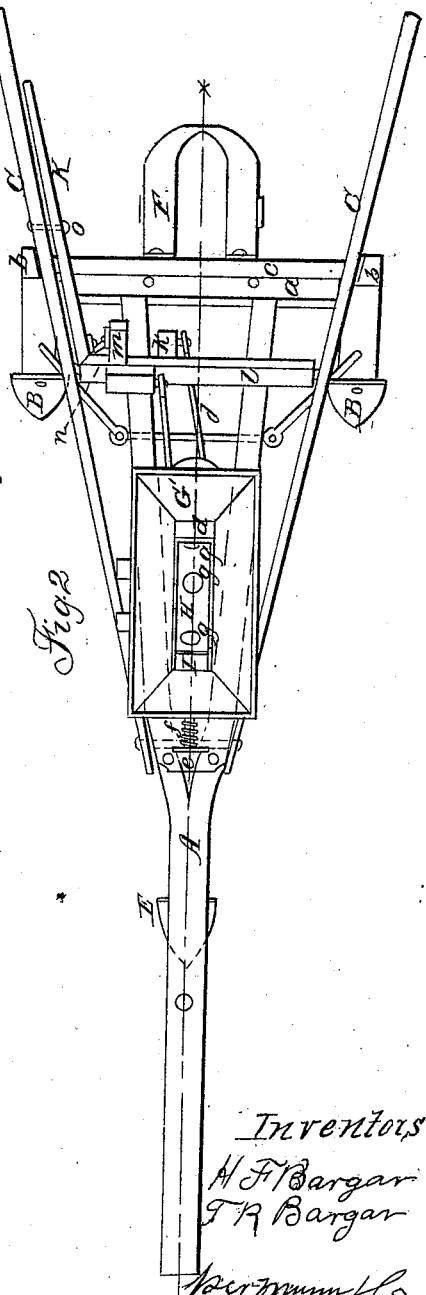

UNITED STATES PATENT OFFICE.

H. F. BARGAR AND T. R. BARGAR, OF BORDER PLAINS, IOWA.

IMPROVEMENT IN CORN-PLANTERS.

Specification forming part of Letters Patent No. 40,595, dated November 17, 1863.

*To all whom it may concern:*

Be it known that we, H. F. BARGAR and T. R. BARGAR, of Border Plains, in the county of Webster and State of Iowa, have invented a new and Improved Corn-Planter; and we do hereby declare that the following is a full, clear, and exact description of the same, reference being had to the accompanying drawings, making a part of this specification, in which—

Figure 1 is a side sectional view of our invention, taken in the line $x\,x$, Fig. 2; Fig. 2, a plan or top view of the same.

Similar letters of reference indicate corresponding parts in the two figures.

This invention relates to a new and improved machine for planting corn in check-rows; and it consists in a novel seed-distributing device operated by the hand of the attendant and so arranged that the corn may be dropped with certainty at the desired spots, as hereinafter fully set forth.

To enable those skilled in the art to fully understand and construct our invention, we will proceed to describe it.

A represents a beam, the back part of which is forked or divaricated, and is attached to a cross-bar, $a$, which has a plow-standard, $b$, secured to each end of it, each standard having a shovel-plow, B, attached to its lower end.

C C are handles, the front ends of which are attached to the sides of the beam A and the back parts attached to the upper ends of the standards $b\,b$ by a cross-rod, $c$, said standards $b$ extending some distance above the beam A.

D is a standard, which is attached to the beam A about at the center of the latter, said standard being somewhat inclined and having a shovel-plow, E, attached to its lower end, the latter being in line with the center of the space between the plows B B. F is a covering-roller connected with the cross-bar $a$.

On the beam A, just back of the front plow-standard, D, there is secured a rectangular box, G, in which a roller or cylinder, H, is fitted and allowed to rotate freely. The width of the cylinder H is equal to the width of the box G, and the sides of the latter are cut out to admit of the sides of the cylinder being flush with the sides of said box. The bearings of the cylinder H are on the beam A, and the box G is provided internally with a plate, $d$, the inner edge of which just clears the back of the cylinder. (See Fig. 1.)

In the box G, at the front of the cylinder, there is fitted a slide, I. This slide has a rod, $e$, attached to it, which passes horizontally through the front of the box G, said rod having a spiral spring, $f$, upon it, which has a tendency to keep the slide in contact with the cylinder H. This will be fully understood by referring to Fig. 1. The cylinder H has holes $g$ made in its periphery at suitable and equal distances apart, and one side of the cylinder has ratchet-teeth $h$ upon it, into which a pawl, J, catches. The pawl J is simply an arm fitted loosely on the axis $i$ of the cylinder H, and the outer end of said arm is connected by a rod, $j$, with an arm, $k$, on a rock-shaft, $l$, which is fitted between the handles C C. This rock-shaft also has another arm, $m$, attached to it at right angles with the arm $k$, and the arm $m$ is connected by a link, $n$, with the front end of a lever, K, the fulcrum $o$ of which passes into the right handle C of the machine. By shoving down the outer end of the lever K the pawl J will be drawn upward a certain distance, and will in rising catch against one of the teeth $h$ of the cylinder H and turn said cylinder, the pawl, as the outer end of the lever K is moved upward, passing down to its original position to engage with another tooth $h$, so as to turn the cylinder when again moved upward. By this arrangement the cylinder H is rotated by an intermittent movement.

L is a pendent seed-conveying spout, attached to the box G, and having a valve, $p$, fitted horizontally in it. This valve is attached to the upper end of a lever, M, the fulcrum-pin $q$ of which passes through a lug, $r$, attached to the spout L.

To the lower end of the lever M there is attached a valve, $s$. The upper end of the lever M is connected by a rod, N, with a projection or short arm, $t$, on the rock-shaft $l$.

To the upper part of the lever M there is attached a curved arm, $u$, which projects upward and when the slide-valve $p$ is shoved inward is within one of the holes $g$ of the cylinder H, as shown in Fig. 1.

On the box G there is secured a hopper, G', in which the corn to be planted is placed.

The operation is as follows: As the machine is drawn along the plow F makes a furrow at right angles to those previously made, the field being furrowed in one direction previous to the machine being used, and each time the spout L comes over the point where the furrow being made intersects a furrow previously made the corn is dropped by pressing down the outer end of the lever K. This dropping operation is as follows: As previously described, the cylinder H is turned a certain distance each time the outer end of the lever K is forced down, and by this turning of the cylinder a hole, $g$, filled with corn, passes below the slide I, which is a cut-off, and the corn in said hole drops into the spout L, and is caught and retained by the valve $p$, which is forced into the spout as the cylinder is turned. When the pawl J is forced down to engage with a succeeding tooth $h$ the valve $p$ is drawn outward from the spout L, and the corn falls to the bottom of the spout L and is caught by the valve $s$, which closes over the bottom of said spout as the valve $p$ is drawn out from it. At the next movement of the cylinder H the valve $s$ opens and the corn is dropped from the spout simultaneously with the discharge of corn from the cylinder H, and which is caught by the valve $p$. The plows throw up the earth at each side of the furrow in which the corn is dropped, and the covering and pressing is done by the roller F.

We do not claim any of the within-described parts separately or irrespective of the arrangement of the same, as herein shown and described.

What we claim therefore as new, and desire to secure by Letters Patent, is—

The arrangement and combination of the cylinder H, pawl J, lever M, provided with the two valves $p$ $s$, rock-shaft $l$, and lever K, as and for the purpose herein set forth.

H. F. BARGAR.
T. R. BARGAR.

Witnesses:
JOHN WILSON,
WILLIAM SPRING.